US007522946B2

(12) United States Patent
Im

(10) Patent No.: US 7,522,946 B2
(45) Date of Patent: Apr. 21, 2009

(54) HINGE APPARATUS FOR MOBILE COMMUNICATION TERMINALS

(75) Inventor: Jin-Man Im, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 760 days.

(21) Appl. No.: 11/068,707

(22) Filed: Mar. 1, 2005

(65) Prior Publication Data

US 2005/0261041 A1 Nov. 24, 2005

(30) Foreign Application Priority Data

May 19, 2004 (KR) .................. 10-2004-0035565

(51) Int. Cl.
*H04M 1/00* (2006.01)
*H04M 9/00* (2006.01)
*H04B 1/38* (2006.01)

(52) U.S. Cl. .............. 455/575.3; 455/575.1; 455/556.1; 379/433.13

(58) Field of Classification Search ............. 455/575.3, 455/575.1, 90.3, 550.1, 556.1, 556.2, 556.7, 455/575.41, 344, 347, 349, 128, 575.8, 575.4; 348/14.01–14.02, 211.14, 211.2, 373–374, 348/376, E5.027, E7.079, 552; 379/433.13, 379/433.3, 3, 433.09, 433.05, 428.01, 433.111, 379/433.04, 33.09, 433.14, 433.02
See application file for complete search history.

(56) References Cited

U.S. PATENT DOCUMENTS

| 6,069,648 | A  | * | 5/2000  | Suso et al. ............... 348/14.02 |
| 6,396,924 | B1 | * | 5/2002  | Suso et al. ............. 379/433.13 |
| 6,829,490 | B2 | * | 12/2004 | Nakamura et al. ....... 455/550.1 |
| 7,076,281 | B2 | * | 7/2006  | Kim ......................... 455/575.7 |
| 7,133,691 | B2 | * | 11/2006 | Kang ....................... 455/556.1 |
| 7,140,073 | B2 | * | 11/2006 | Park et al. .................... 16/348 |
| 7,145,593 | B2 | * | 12/2006 | Yamaguchi et al. ....... 348/14.02 |
| 7,146,200 | B2 | * | 12/2006 | Park et al. ............... 455/575.3 |
| 7,154,744 | B2 | * | 12/2006 | Sawai ........................ 361/681 |
| 7,193,653 | B2 | * | 3/2007  | Lee ............................ 348/373 |
| 7,227,565 | B2 | * | 6/2007  | Kawahara ................ 348/14.02 |
| 7,269,255 | B2 | * | 9/2007  | Satoh et al. ............ 379/428.01 |
| 7,269,442 | B2 | * | 9/2007  | Sato et al. ................ 455/556.1 |
| 7,369,175 | B2 | * | 5/2008  | Kim ............................. 348/373 |
| 2004/0110541 | A1 | * | 6/2004 | Choo ......................... 455/566 |
| 2004/0203535 | A1 | * | 10/2004 | Kim et al. ................. 455/90.3 |

(Continued)

FOREIGN PATENT DOCUMENTS

CN 1404284 3/2003

(Continued)

*Primary Examiner*—Pablo N Tran
(74) *Attorney, Agent, or Firm*—The Farrell Law Firm, PC

(57) ABSTRACT

Disclosed is a hinge apparatus for mobile communication terminals having a camera lens module and a hinge assembly mounted therein including a terminal body and a folder part for rotating the terminal body and the folder part relative to each other about a hinge axis. The hinge apparatus includes first and second hinge housings extending in the longitudinal directions thereof, and connected to each other in line such that they can be rotated relative to each other about a hinge axis. The first and second hinge housings have accommodating spaces defined therein. A camera lens module and a hinge assembly are selectively disposed in one of the first and second hinge housings

15 Claims, 8 Drawing Sheets

U.S. PATENT DOCUMENTS

| | | | |
|---|---|---|---|
| 2004/0218092 A1* | 11/2004 | Kim | 348/375 |
| 2005/0090297 A1* | 4/2005 | Yang et al. | 455/575.3 |
| 2005/0186996 A1* | 8/2005 | Pan | 455/575.3 |
| 2005/0282596 A1* | 12/2005 | Park et al. | 455/575.3 |
| 2006/0160583 A1* | 7/2006 | Ryu | 455/575.3 |
| 2006/0293096 A1* | 12/2006 | Kakuguchi et al. | 455/575.3 |
| 2007/0026909 A1* | 2/2007 | Jung et al. | 455/575.3 |
| 2007/0161414 A1* | 7/2007 | Wang et al. | 455/575.3 |

FOREIGN PATENT DOCUMENTS

| | | |
|---|---|---|
| CN | 1463530 | 12/2003 |
| JP | 07-236147 | 9/1995 |
| JP | 10-294948 | 11/1998 |
| JP | 2000-244934 | 9/2000 |
| JP | 2001-231052 | 8/2001 |
| JP | 2001-320720 | 11/2001 |
| JP | 2002-374434 | 12/2002 |

* cited by examiner

HINGE APPARATUS FOR MOBILE COMMUNICATION TERMINALS

PRIORITY

This application claims priority to an application entitled "HINGE APPARATUS FOR MOBILE COMMUNICATION TERMINALS", filed in the Korean Intellectual Property Office on May 19, 2004 and assigned Serial No. 2004-35565, the contents of which are hereby incorporated by reference.

BACKGROUND OF THE INVENTION

1. Field of the Invention

The present invention relates to a hinge apparatus for mobile communication terminals, and more particularly to a hinge apparatus for mobile communication terminals having a camera lens module and a hinge assembly mounted therein.

2. Description of the Related Art

Generally, the phrase "portable communication devices" means electronic devices that are portable and enable owners of the devices to communicate through wireless communication. Such portable communication devices include hand held PCs (HHP), CT-2 cellular phones, digital phones, PCS phones, and PDAs. On the basis of their configuration, portable communication devices may be classified into several types of wireless terminals. For example, the wireless terminals may be basically classified into either a bar-type wireless terminal, a flip-type wireless terminal, or a folder-type wireless terminal. The bar-type wireless terminal has a bar-type single housing, the flip-type wireless terminal comprises a bar-type housing and a flip part rotatably attached to the housing by means of a hinge apparatus, and the folder-type wireless terminal comprises a bar-type housing and a folder part rotatably attached to the housing by means of a hinge apparatus.

Such communication terminals have various functions, such as transmitting/receiving e-mails or data, playing Internet games, or transmitting text messages, in addition to their basic function, i.e., audio communication function. Also, service ranges of the communication terminals, such as image communication between users of the communication terminals or a motion picture service, have been increasingly expanded recently as the communication terminals adopt new communication technologies, such as CDMA 1xEVDO. A camera lens has become an indispensable component of the portable wireless terminal as image communication and motion picture service using the portable wireless terminal are expanded.

FIG. 1 is a perspective view showing a conventional mobile communication terminal. As shown in FIG. 1, the conventional mobile communication terminal comprises a terminal body 10 and a folder part 20. The terminal body 10 is provided with various key buttons 11 and a microphone 12. The folder part 20 is provided with a liquid crystal display unit 21 and a speaker 22. The folder part 20 is rotatably connected to the terminal body 10 by means of a hinge apparatus 30.

The hinge apparatus 30 includes first and second side hinge arms 31 and 32 integrally formed on the terminal body 10 while being spaced apart from each other, and a center hinge arm 33 integrally formed on the folder part 20 while being disposed between the first and second side hinge arms 31 and 32. To the first side hinge arm 31 is attached a camera lens module 40.

The camera lens module 40 includes a lens housing 41 for accommodating a camera lens 41a, and a lens shaft (not shown) securely fixed to the lens housing 41 while extending in the direction where the hinge arms 31, 32 and 33 are arranged such that the lens shaft can be rotated predetermined degrees about a hinge axis A1 of the hinge arms 31, 32 and 33.

In the center hinge arm 33 is mounted a hinge assembly (not shown) for rotating the folder part 20 relative to the terminal body 10. The center hinge arm 33 having the hinge assembly mounted therein is rotatably disposed between the first side hinge arm 31 and the second side hinge arm 32. At one end of the center hinge arm 33 is formed an engaging protrusion (not shown), by which the center hinge arm 33 is rotatably connected to the first side hinge arm 31.

In the conventional folder-type mobile communication terminal as described above, the camera lens module is attached to the first side hinge arm, the hinge assembly is mounted in the center hinge arm. As a result, the assembly of the hinge apparatus is complicated. Also, the hinge apparatus requires an additional mounting space, which increases the size of the hinge apparatus. Consequently, the size of the mobile communication terminal is also increased, and thus the mobile communication terminal is not provided with an aesthetically pleasing appearance.

Furthermore, the camera lens module is exposed to the external environment. Consequently, the camera lens module may be easily damaged by external impact.

SUMMARY OF THE INVENTION

Therefore, the present invention has been made in view of the above problem, and it is an object of the present invention to provide a hinge apparatus for mobile communication terminals having a camera lens module and a hinge assembly mounted therein.

It is another object of the present invention to provide a hinge apparatus for mobile communication terminals having a camera lens module and a hinge assembly mounted therein, whereby spatial utilization of the hinge apparatus is increased, and assembly efficiency of the mobile communication terminal is improved.

In accordance with the present invention, the above and other objects can be accomplished by the provision of a hinge apparatus mounted to a mobile communication terminal including a terminal body and a folder part for rotating the terminal body and the folder part relative to each other about a hinge axis, wherein the hinge apparatus includes first and second hinge housings extending in the longitudinal directions thereof, respectively, and connected to each other in line such that they can be rotated relative to each other about the hinge axis, the first and second hinge housings having accommodating spaces defined therein, respectively; and a camera lens module and a hinge assembly selectively disposed in one of the first and second hinge housings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
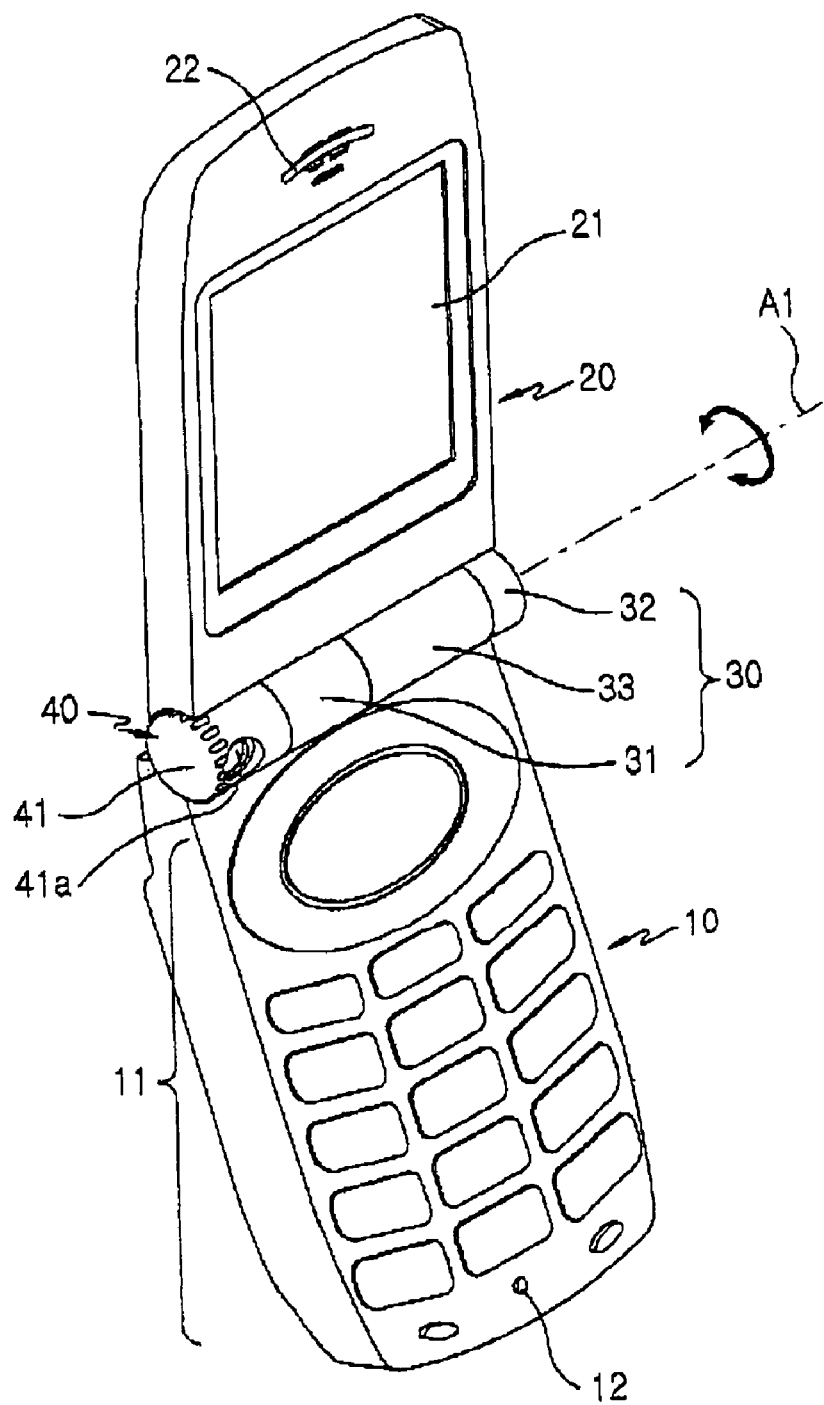
FIG. 1 is a perspective view showing a conventional mobile communication terminal with a folder part opened.

Now, a preferred embodiment of the present invention will be described in detail with reference to the accompanying drawings. In the drawings, the same or similar elements are denoted by the same reference numerals even though they are depicted in different drawings.

Referring to FIGS. 2 to 8, a mobile communication terminal includes a terminal body 10 and a folder part 20. A hinge apparatus 100 of the mobile communication terminal includes first and second hinge housings 200 and 300, a camera lens module 400, and a hinge assembly 500. The first and second hinge housings 200 and 300 extend in the longitudinal directions thereof, respectively, and are connected to each other in line such that they can be rotated relative to each other about a hinge axis A1. The first hinge housing 200 is integrally formed at a predetermined position on the lower end of the folder part 20. The second hinge housing 300 is integrally formed at a predetermined position on the upper end of the terminal body 10. Inside the first and second hinge housings 200 and 300 are defined accommodating spaces 201 and 301, respectively.

The camera lens module 400 and the hinge assembly 500 are disposed in the accommodating space 201 of the first hinge housing 200. The first and second hinge housings 200 and 300 are rotatably connected to each other by means of the hinge assembly 500.

At the outer circumference of the first hinge housing 200 is formed a lens hole 202, through which a lens window of the camera lens module 400 is exposed to the external environment. At one end of the first hinge housing 200 is formed a hinge-side engaging groove 203, in which is engaged an engaging protrusion 302 formed at the second hinge housing 300. In the accommodating space 301 (FIG. 7) of the second hinge housing 300 is disposed a button unit 303, which is exposed to the external environment.

The engaging protrusion 302 is formed at one end of the second hinge housing 300 such that the engaging protrusion 302 can be engaged in the hinge-side engaging groove 203 of the first hinge housing 200. The hinge-side engaging groove 203 and the engaging protrusion 302 are each formed in the shape of a ring.

The hinge assembly 500 comprises a shaft 501, a hinge shaft 503, a coil spring 504, a hinge cylinder 505, and a stopper 506. The shaft 501 is provided at one end thereof with a hinge cam 502 having a curved valley part 502a, which corresponds to a curved crest part 503b of the hinge shaft 503.

One end of the shaft 501 extends through a through-hole 204 of the first hinge housing 200 such that the shaft 501 can be securely connected to the stopper 506. The hinge shaft 503 is provided at the center thereof with a shaft hole 503a, through which the shaft 501 is inserted. The curved crest part 503b is formed at one end of the hinge shaft 503. The curved crest part 503b corresponds to the curved valley part 502a of the hinge cam 502.

The hinge shaft 503 is provided at the outer circumference thereof with at least one guide protrusion 503c, which is engaged in a guide groove 505a formed in the hinge cylinder 505.

The coil spring 504 presses against the hinge shaft 503 such that the curved crest part 503b is in sliding contact with the curved valley part 502a. One end of the coil spring 504 contacts the hinge shaft 503, and the other end of the coil spring 504 contacts a closed end 505d of the hinge cylinder 505. The hinge cylinder 505 also has an open end 505c, which is opposite to the closed end 505d of the hinge cylinder 505.

The coil spring 504, the hinge shaft 503, and the shaft 501 are successively inserted in the hinge cylinder 505 through the open end 505c. The guide groove 505a is formed at the inner circumference of the hinge cylinder 505 for guiding the guide protrusion 503c of the hinge shaft 503. The hinge cylinder 505 is provided at the outer circumference thereof with at least one fixing protrusion 505b, by which the hinge cylinder 505 is securely fixed to the first hinge housing 200.

The stopper 506 is disposed in the second hinge housing 300. The stopper 506 is connected to one end 501a of the shaft 501, which is protruded from the open end 505c of the hinge cylinder 505, for restricting the rotation of the folder part 20. Specifically, the stopper 506 is disposed in the accommodating space 301 of the second hinge housing 300. The stopper 506 is inserted through a hinge-side through-hole 304 formed at the second hinge housing 300. The hinge shaft 503 is linearly reciprocated in the hinge cylinder 505.

The shaft 501 is provided at the outer circumference of one end thereof with a ring-shaped groove 501b, which is formed in the circumferential direction thereof.

The hinge cylinder 505 is provided at the closed end 505d thereof with a cylinder-side through-hole 505e, through which the shaft 501 is inserted such that the ring-shaped groove 501b is exposed out of the hinge cylinder 505. Around the ring-shaped groove 501b of the shaft 501, which is exposed out of the hinge cylinder 505 through the cylinder-side through-hole 505e, is fitted an E-ring 600, by which the shaft 501 is securely fixed to the hinge cylinder 505. Between the E-ring 600 and the closed end 505d of the hinge cylinder 505 is disposed at least one washer 700.

The stopper 506 is provided at the center thereof with a screw hole 506b, in which a screw 800 is inserted. The stopper 506 is provided at one end thereof with a stopper protrusion 506a, which is engaged in a stopper groove 505f formed at the open end 505c of the hinge cylinder 505.

The operation of the hinge apparatus for mobile communication terminals with the above-stated construction according to the preferred embodiment of the present invention will be described hereinafter in detail with reference to FIGS. 2 to 8.

Figure 2:
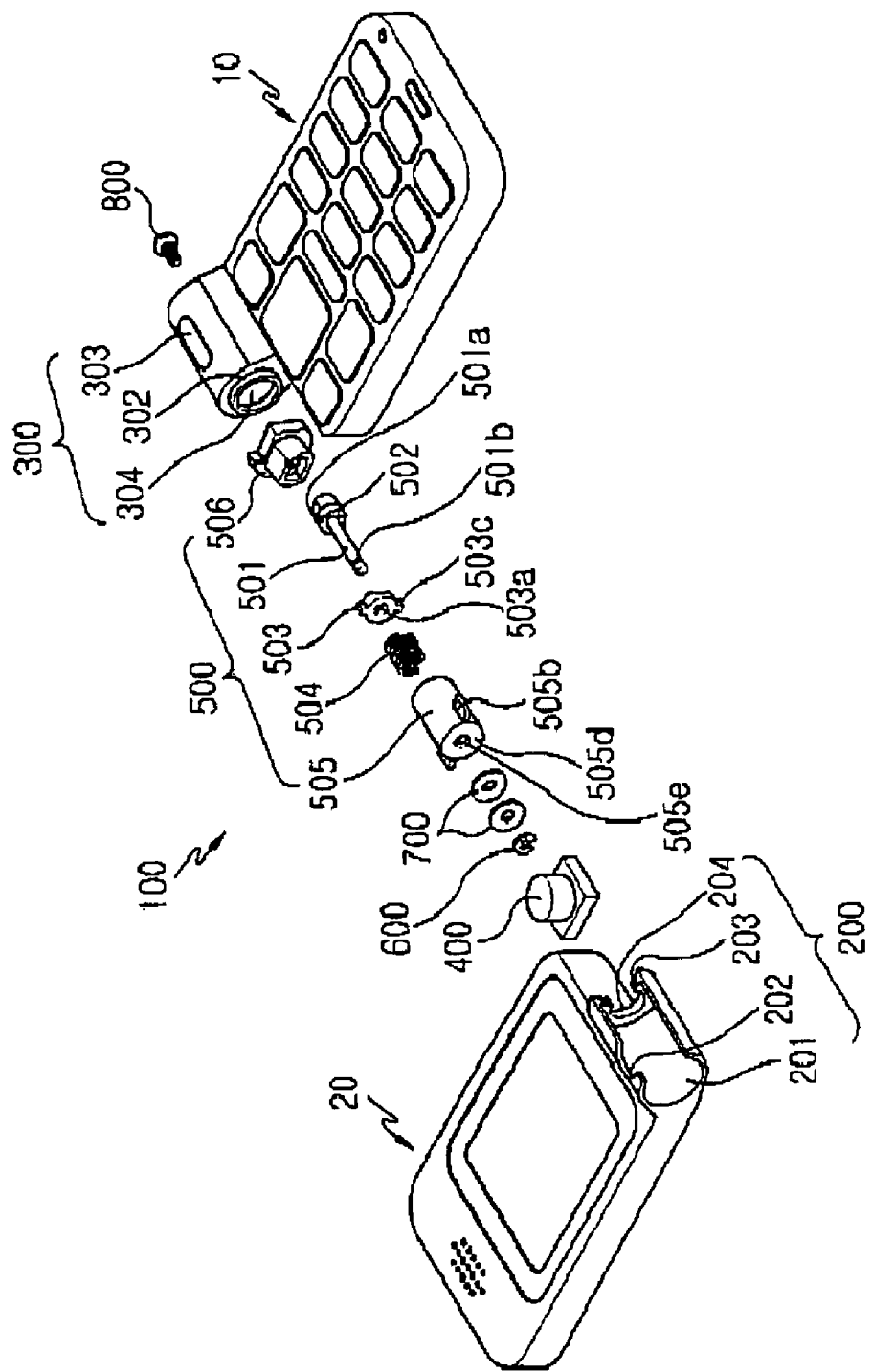
FIG. 2 is an exploded perspective view of a hinge apparatus for mobile communication terminals according to a preferred embodiment of the present invention showing the construction of the hinge apparatus.

As shown in FIG. 2, the hinge apparatus 100 includes the first and second hinge housings 200 and 300, the camera lens module 400, and the hinge assembly 500.

Figure 3:
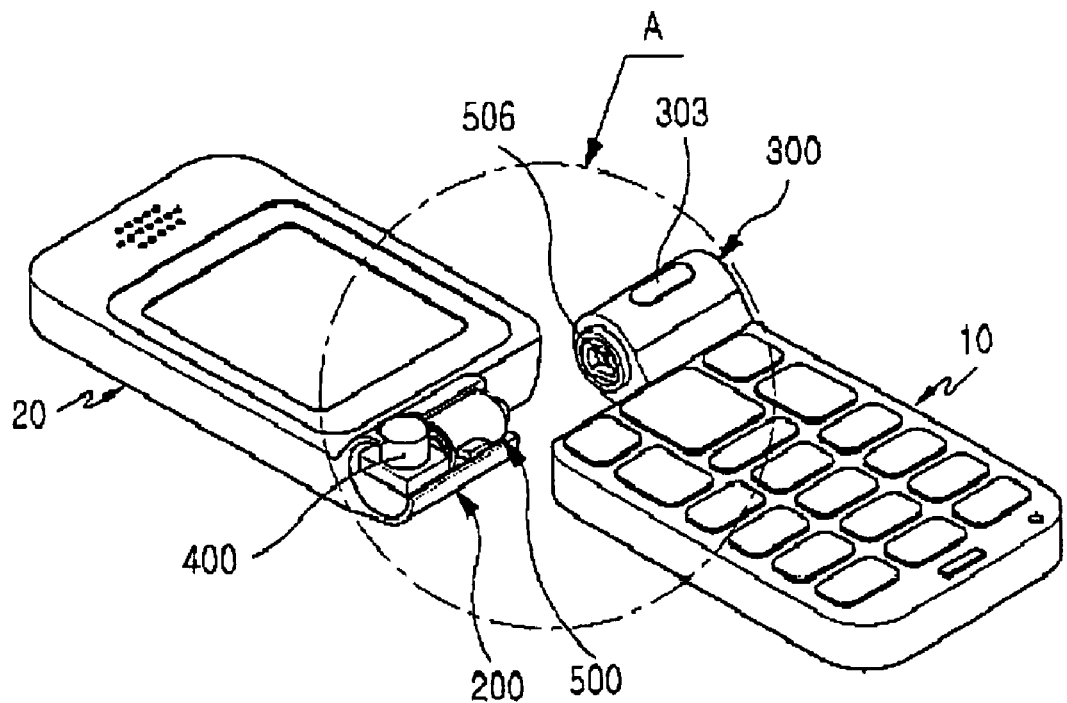
FIG. 3 is an exploded perspective view of the hinge apparatus for mobile communication terminals according to the preferred embodiment of the present invention showing the hinge apparatus assembled.
Figure 4:
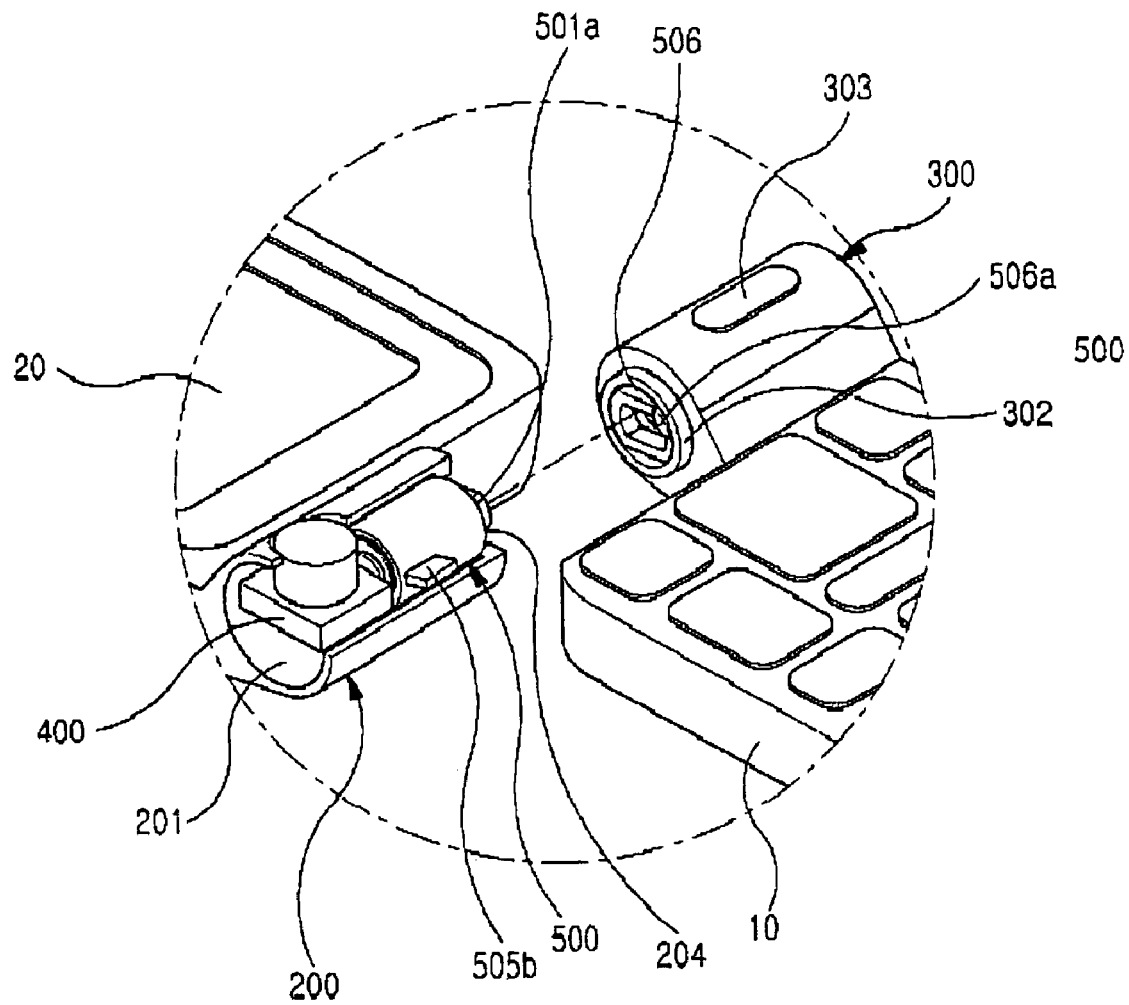
FIG. 4 is an enlarged view showing area A of FIG. 3.

As shown in FIGS. 3 and 4, the first hinge housing 200 is integrally formed at a predetermined location on the lower end of the folder part 20 in the direction of the hinge axis A1.

The camera lens module 400 and the hinge assembly 500 are disposed in the accommodating space 201 of the first hinge housing 200.

As shown in FIG. 4, the camera lens module 400 is mounted in the first hinge housing 200 such that the lens window of the camera lens module 400 to be exposed to the external environment through the lens hole 202 formed through the outer circumference of the first hinge housing 200. The hinge assembly 500 is mounted in the accommodating space 201 of the first hinge housing 200.

As shown in FIGS. 3 and 4, the hinge assembly 500 is securely attached to the first hinge housing 200 by means of the fixing protrusion 505b formed on the hinge cylinder 505 of the hinge assembly 500. The hinge cylinder 505 has the open end 505c and the closed end 505d.

Figure 5:
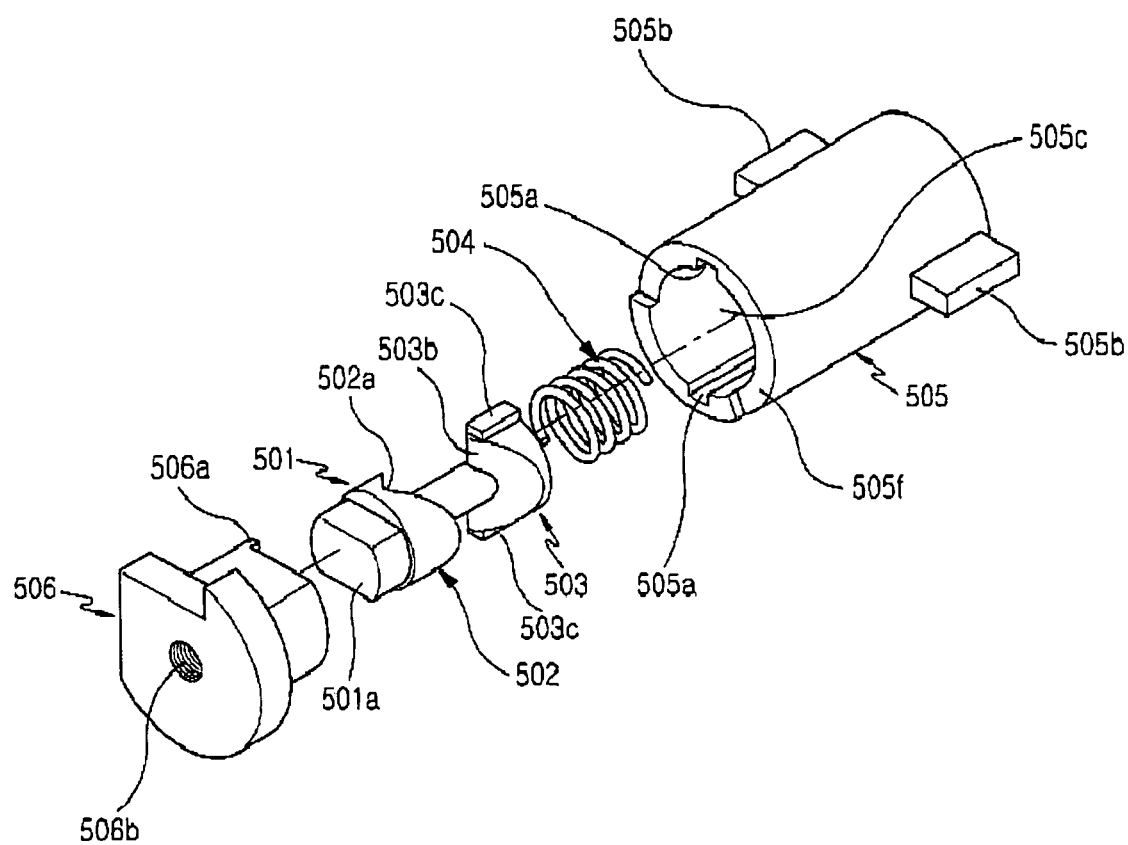
FIG. 5 is an exploded perspective view showing a hinge assembly of the hinge apparatus for mobile communication terminals according to the preferred embodiment of the present invention.

As shown in FIG. 5, the coil spring 504, the hinge shaft 503, and the shaft 501 are successively inserted into the hinge cylinder 505 through the open end 505c such that the end 501a of the shaft 501 protrudes from the open end 505c of the hinge cylinder 505.

As shown in FIG. 2, the protruded end 501a of the shaft 501 is connected to the stopper 506 disposed in the second hinge housing 300.

As shown in FIGS. 3 and 4, the first and second hinge housings 200 and 300 are connected to each other in line while the inner end of the first hinge housing 200 is opposite to the inner end of the second hinge housing 300, which is integrally formed at a predetermined position of the upper end of the terminal body 10.

Figure 7:
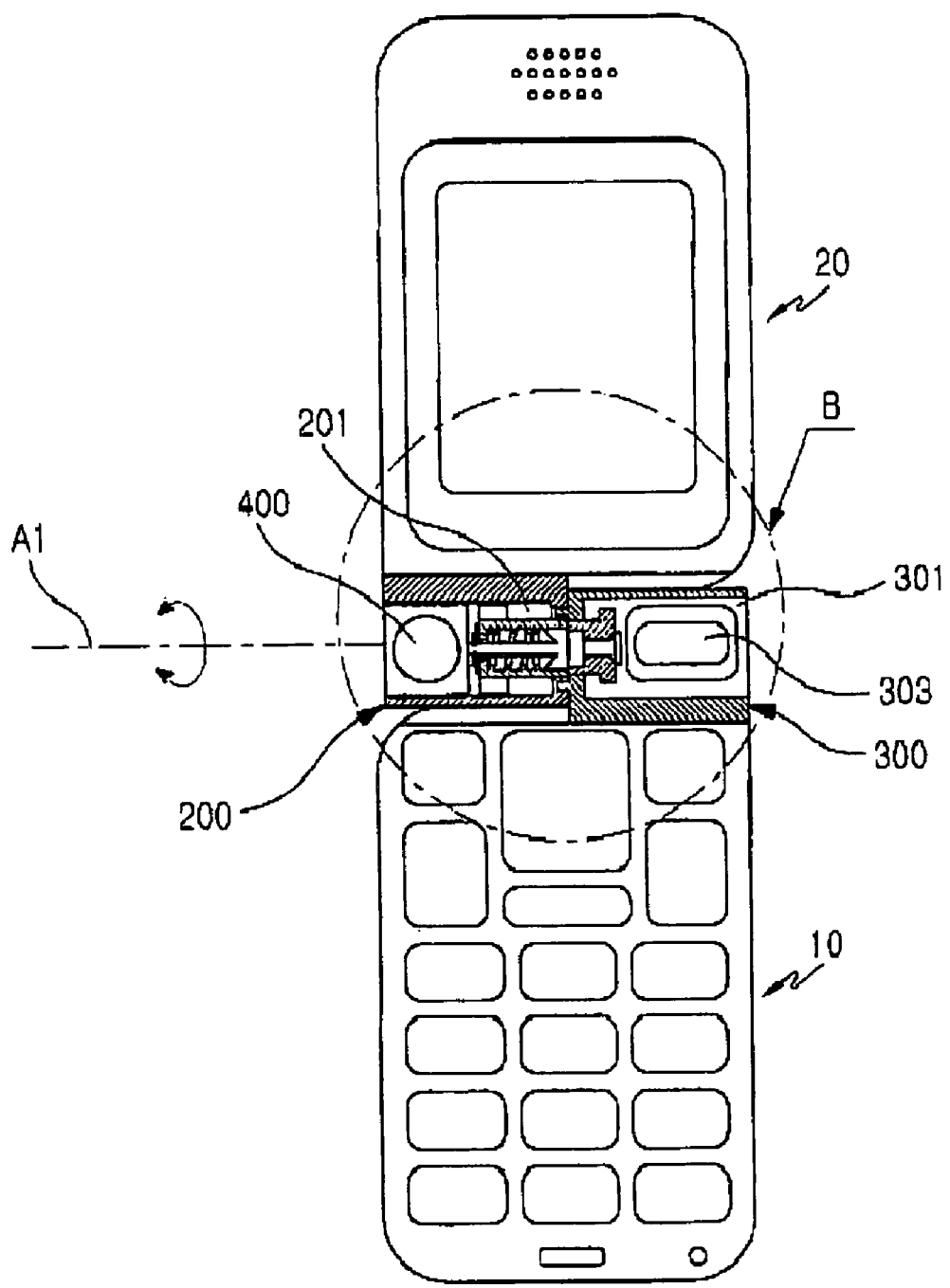
FIG. 7 is a sectional view of the hinge apparatus for mobile communication terminals according to the preferred embodiment of the present invention showing the operation of the hinge apparatus.
Figure 8:
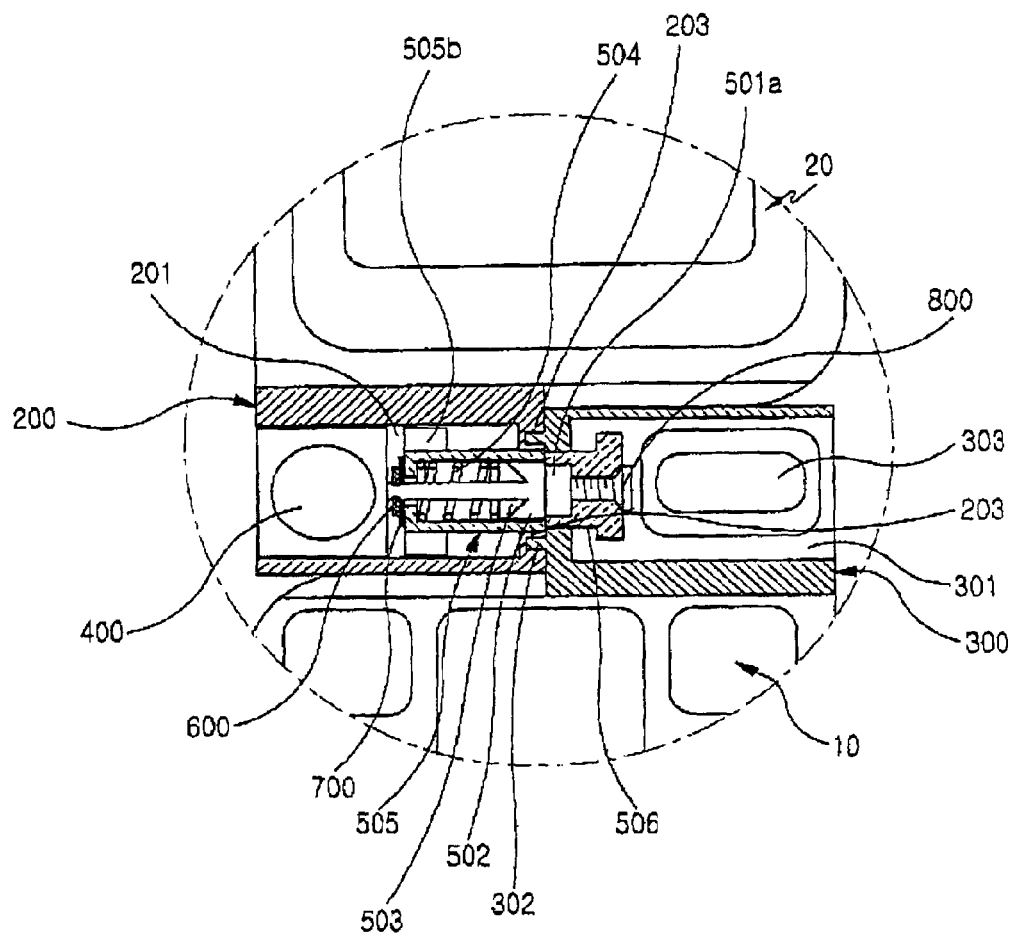
FIG. 8 is an enlarged view showing area B of FIG. 7.

As shown in FIGS. 7 and 8, the engaging protrusion 302 is formed at one end of the second hinge housing 300 such that the engaging protrusion 302 to engage the hinge-side engaging groove 203 of the first hinge housing 200. When the first and second hinge housings 200 and 300 are connected to each other, the engaging protrusion 302 is engaged in the hinge-side engaging groove 203.

Figure 6:
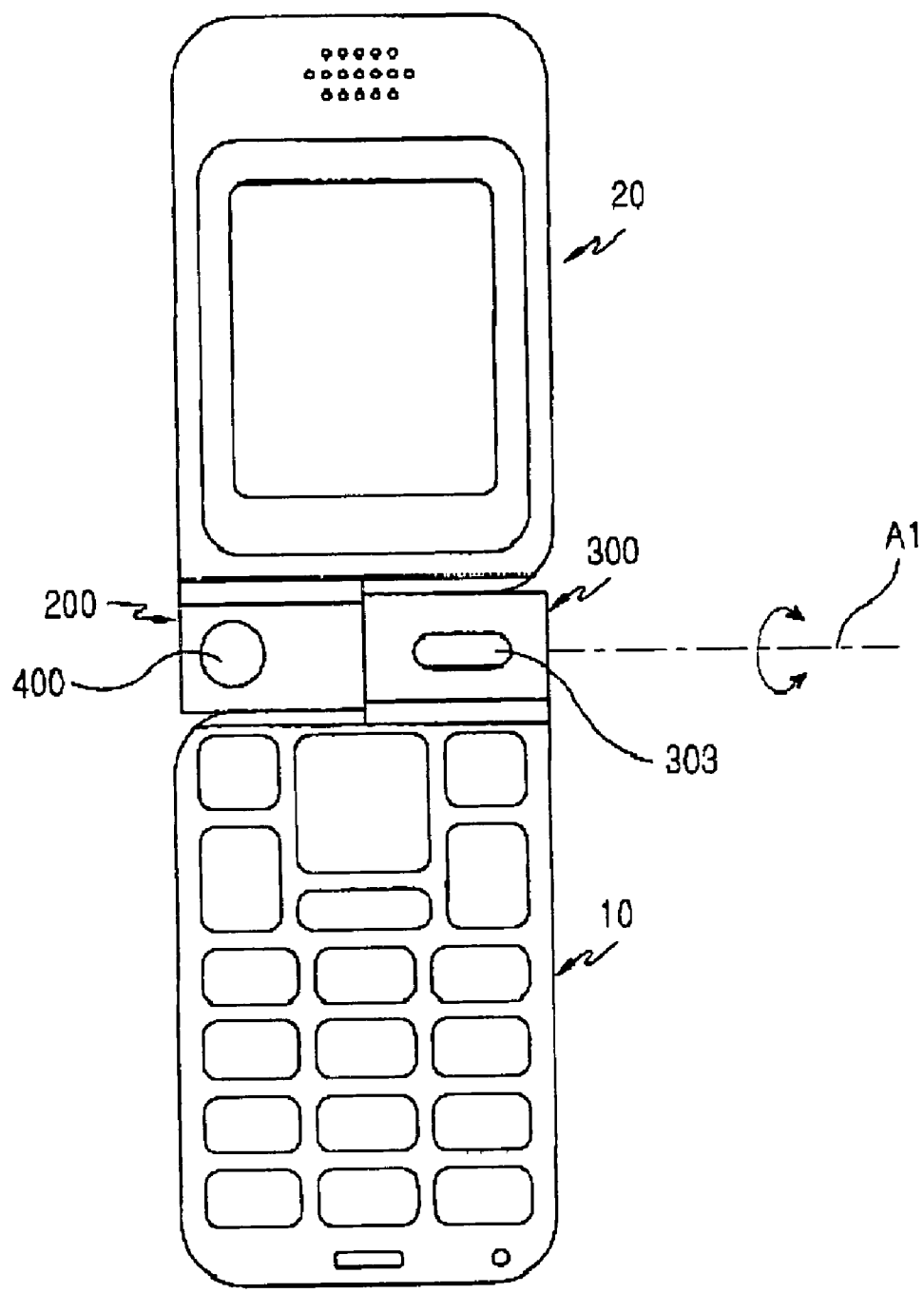
FIG. 6 is a plan view of the hinge apparatus for mobile communication terminals according to the preferred embodiment of the present invention showing the operation of the hinge apparatus.

As shown in FIGS. 6 and 7, the button unit 303 is disposed in the accommodating space 301 of the second hinge housing 300 such that it is exposed to the external environment.

Alternatively, the button unit 303 may be disposed in the accommodating space 201 of the first hinge housing 200, and correspondingly, the camera lens module 400 and the hinge assembly 500 may be disposed in the accommodating space 301 of the second hinge housing 300.

As is apparent from the above description, the present invention provides a hinge apparatus for mobile communication terminals having two hinge housings wherein a camera lens module and a hinge assembly are disposed in any one of the hinge housings, and a button unit is disposed in the other hinge housing. Consequently, the present invention has the effect of increasing spatial utilization of the hinge apparatus and improving assembly efficiency of the mobile communication terminal.

Although the preferred embodiment of the present invention has been disclosed for illustrative purposes, those skilled in the art will appreciate that various modifications, additions and substitutions are possible, without departing from the scope and spirit of the invention as disclosed in the accompanying claims. For example, the present invention may be suitably applied to any portable communication device.

What is claimed is:

1. A hinge apparatus for a mobile communication terminal including a terminal body, and a folder part for rotating the terminal body and the folder part relative to each other about a hinge axis, the hinge apparatus comprising:

first and second hinge housings extending in the longitudinal directions thereof, respectively, and connected to each other in line such that they can be rotated relative to each other about the hinge axis, the first and second hinge housings having accommodating spaces defined therein; and a camera lens module and a hinge assembly selectively disposed in one of the first and second hinge housings, the camera lens module having a lens window being exposed to an external environment through a lens hole formed on an outer circumference of one of the first and second hinge housings.

2. The apparatus as set forth in claim 1, wherein the first hinge housing is integrally formed at a lower end of the folder part, and the second hinge housing is integrally formed at an upper end of the terminal body.

3. The apparatus as set forth in claim 1, wherein the camera lens module and the hinge assembly are disposed in the accommodating space of the first hinge housing, and the first and second hinge housings are rotatably connected to each other by means of the hinge assembly.

4. The apparatus as set forth in claim 1, wherein the lens hole is on the first hinge housing.

5. The apparatus as set forth in claim 1, wherein first hinge housing is provided at one end thereof with a hinge-side engaging groove to allow an engaging protrusion formed on the second hinge housing to engage the hinge-side engaging groove.

6. The apparatus as set forth in claim 5, wherein the hinge-side engaging groove and the engaging protrusion are each formed in the shape of a ring.

7. The apparatus as set forth in claim 1, wherein a button unit is disposed in the accommodating space of the second hinge housing while being exposed to the external environment, and the second hinge housing is provided at one end thereof with an engaging protrusion, the engaging protrusion being engaged in a hinge-side engaging groove formed on the first hinge housing.

8. The apparatus as set forth in claim 7, wherein the hinge-side engaging groove and the engaging protrusion are each formed in the shape of a ring.

9. The apparatus as set forth in claim 1, wherein the hinge assembly comprises:

a shaft extending through a through-hole of the first hinge housing, the shaft provided at one end thereof with a hinge cam having a curved valley part;

a hinge shaft having a shaft hole for allowing the shaft to be inserted therethrough, the hinge shaft being provided at one end thereof with a curved crest part corresponding to the curved valley part of the hinge cam, the hinge shaft being provided at an outer circumference thereof with at least one guide protrusion;

a coil spring biased against the hinge shaft forcing the curved crest part to be in sliding contact with the curved valley part;

a hinge cylinder having an open end and a closed end for successively accommodating the coil spring, the hinge shaft and the shaft, one end of the coil spring contacting the closed end of the hinge cylinder, the hinge cylinder being provided with a guide groove for guiding the guide protrusion of the hinge shaft, the hinge cylinder also being provided with at least one fixing protrusion for fixing the hinge cylinder to the first hinge housing; and a stopper connected to one end of the shaft protruding from the open end of the hinge cylinder for restricting rotation of the folder part.

10. The apparatus as set forth in claim 9, wherein the stopper is disposed in the accommodating space of the second hinge housing, and the stopper is inserted through a hingeside through-hole formed on the second hinge housing.

11. The apparatus as set forth in claim 9, wherein the hinge shaft is linearly reciprocated in the hinge cylinder.

12. The apparatus as set forth in claim 9, wherein the shaft is provided at the outer circumference of one end thereof with a ring-shaped groove formed in the circumferential direction thereof, the hinge cylinder is provided at the closed end thereof with a cylinder-side through-hole for allowing the shaft to be inserted therethrough such that the ring-shaped groove is exposed on the outside of the hinge cylinder, and an E-ring is fitted around the ring-shaped groove of the shaft exposed on the outside of the hinge cylinder through the cylinder-side through-hole such that the shaft is securely fixed to the hinge cylinder.

13. The apparatus as set forth in claim 12, wherein at least one washer is disposed between the E-ring and the closed end of the binge cylinder.

14. The apparatus as set forth in claim 9, wherein the stopper is provided at one end thereof with a stopper protrusion, the stopper protrusion being engaged in a stopper groove formed adjacent to the open end of the hinge cylinder.

15. A hinge apparatus mounted to a mobile communication terminal having a terminal body and a folder part for rotating the terminal body and the folder part relative to each other about a hinge axis, comprising:

first and second hinge housings extending in the longitudinal direction thereof and connected to each other in line such that they can be rotated relative to each other about the hinge axis, the first and second hinge housings having accommodating spaces defined therein;

a camera lens module and a hinge assembly disposed in at least one of the first and second hinge housings, the camera lens module having a lens window being exposed to external environment through a lens hole formed on an outer circumference of one of the first and second hinge housings; and a button unit disposed in at least one of the first and second hinge housings.

* * * * *